United States Patent
Brown

(10) Patent No.: US 9,492,774 B2
(45) Date of Patent: Nov. 15, 2016

(54) PARTICULATE FILTER OVERHEAT PROTECTION

(71) Applicant: Ford Global Technologies, LLC, Dearborn, MI (US)

(72) Inventor: Nicholas James Brown, Hornchurch (GB)

(73) Assignee: Ford Global Technologies, LLC, Dearborn, MI (US)

( * ) Notice: Subject to any disclaimer, the term of this patent is extended or adjusted under 35 U.S.C. 154(b) by 155 days.

(21) Appl. No.: 14/279,087

(22) Filed: May 15, 2014

(65) Prior Publication Data

US 2014/0366722 A1 Dec. 18, 2014

(30) Foreign Application Priority Data

Jun. 14, 2013 (GB) .................... 1310631.5

(51) Int. Cl.
| | |
|---|---|
| *B01D 46/30* | (2006.01) |
| *B01D 46/00* | (2006.01) |
| *F01N 11/00* | (2006.01) |
| *F01N 13/00* | (2010.01) |
| *F01N 3/021* | (2006.01) |
| *F01N 3/022* | (2006.01) |
| *F01N 3/10* | (2006.01) |

(52) U.S. Cl.
CPC .......... *B01D 46/0086* (2013.01); *F01N 3/021* (2013.01); *F01N 3/0222* (2013.01); *F01N 11/002* (2013.01); *F01N 13/008* (2013.01); *F01N 3/103* (2013.01); *F01N 13/0097* (2014.06); *F01N 2330/06* (2013.01); *F01N 2560/06* (2013.01); *F01N 2900/0416* (2013.01); *F01N 2900/1602* (2013.01); *F01N 2900/1631* (2013.01); *Y02T 10/20* (2013.01); *Y02T 10/47* (2013.01)

(58) Field of Classification Search
CPC ..................... F01N 11/002; F01N 9/00; F01N 2900/1404; F01N 2900/1602; F01N 3/021; F01N 3/022; F01N 13/008
See application file for complete search history.

(56) References Cited

U.S. PATENT DOCUMENTS

| | | | | |
|---|---|---|---|---|
| 1,532,473 | A * | 4/1925 | Byrne ....................... | F01N 3/06 239/288 |
| 4,531,486 | A * | 7/1985 | Reif .................... | G01N 15/0656 123/198 D |
| 4,685,066 | A * | 8/1987 | Hafele ................. | B01D 35/143 210/90 |

(Continued)

FOREIGN PATENT DOCUMENTS

| | | |
|---|---|---|
| DE | 102004063255 B3 | 5/2006 |
| EP | 2666983 A1 | 11/2013 |

OTHER PUBLICATIONS

Intellectual Property Office, Search Report of GB1310631.5, Jan. 15, 2014, United Kingdom, 5 pages.

*Primary Examiner* — Amber R Orlando
(74) *Attorney, Agent, or Firm* — Julia Voutyras; Alleman Hall McCoy Russell & Tuttle LLP

(57) ABSTRACT

A thermal fuse is installed in the exhaust flow path in or from a diesel particulate filter (DPF) of a combustion engine. At a temperature corresponding to overheating, or imminent overheating, of the DPF, the thermal fuse is activated to generate a signal initiating steps to avoid overheating of the DPF, such as shutting down of the engine.

7 Claims, 2 Drawing Sheets

(56) References Cited

U.S. PATENT DOCUMENTS

| | | | |
|---|---|---|---|
| 5,778,278 A | 7/1998 | Jeon | |
| 6,010,549 A * | 1/2000 | Higashi | F01N 3/06 55/385.3 |
| 7,299,629 B2 | 11/2007 | Betz et al. | |
| 2004/0100353 A1 | 5/2004 | Tanaka | |
| 2008/0285253 A1* | 11/2008 | Scheiber | D06F 58/26 361/837 |
| 2009/0044515 A1* | 2/2009 | Lu | F02D 23/02 60/277 |
| 2009/0085521 A1* | 4/2009 | Kim | H02J 7/0031 320/134 |
| 2009/0097528 A1 | 4/2009 | Simon, III et al. | |
| 2009/0322991 A1* | 12/2009 | Furusawa | H05B 41/2985 349/70 |
| 2012/0006009 A1* | 1/2012 | Jonouchi | F01N 9/002 60/277 |
| 2014/0072919 A1* | 3/2014 | Deng | F23C 1/08 431/278 |
| 2014/0251718 A1* | 9/2014 | Yasoshina | F01N 3/10 181/211 |

* cited by examiner

PARTICULATE FILTER OVERHEAT PROTECTION

CROSS REFERENCE TO RELATED APPLICATIONS

The present application claims priority to G. B. Patent Application No. 1310631.5, "PARTICULATE FILTER OVERHEAT PROTECTION," filed Jun. 14, 2013, the entire contents of which are hereby incorporated by reference for all purposes.

BACKGROUND

Summary

Particulate filters disposed in an exhaust system of an engine are used to reduce the discharge of soot to the atmosphere. Particulate filters are subjected to periodic regeneration where the temperature of the exhaust system is increased and maintained for a time period to combust the soot. Particulate filters may overheat and degrade the particulate filter elements, such as melting the metallic casing of the particulate filter. A degraded particulate filter may release soot to the atmosphere. Therefore, steps to identify overheating of the particulate filter should be taken.

One example approach to identify overheating of the particulate filter includes temperature sensors, which may be provided in the exhaust flow downstream of the diesel particulate filter (DPF). The output from these sensors is input to a control arrangement, such as an engine management system. The sensor detecting a temperature above a threshold signifies overheating.

A potential issue noted by the inventors with the above approach is that overheating of the particulate filter may involve temperatures in excess of 900° C. This temperature is beyond the range of the material thresholds of current temperature sensors. Therefore, the costly temperature sensor has to be replaced if overheating occurs.

One potential approach to at least partially address some of the above issues is to use a thermal fuse positioned in an exhaust flow path through or from the filter. The fuse may comprise a body of an electrically conductive fusible material into which extends a pair of electrical contacts of a material having a higher melting point than the fusible material. The thermal fuse may further comprise a casing in which the body of fusible material is disposed and which is open at one end for the discharge of the fusible material when molten. The resistance of the thermal fuse is monitored, and a resistance value above a threshold value indicates the fusible material has been discharged and the thermal fuse activated. Further, the open end of the thermal fuse allows for visual inspection to determine if the fuse was activated. The thermal fuse may be easily replaced for low cost and may include materials which melt at a desired temperature to indicate overheating of the particulate filter.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
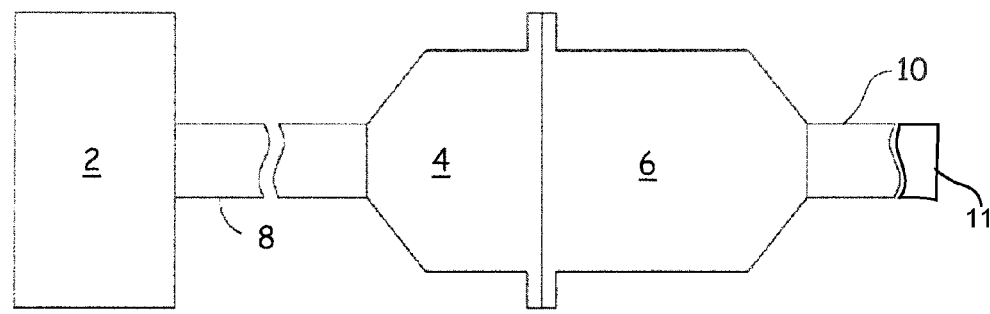
FIG. 1 is a schematic view of part of a motor vehicle exhaust system.

This present application relates to particulate filter overheat detection and, for example, with the detection of overheating in a diesel particulate filter (DPF) in a vehicle.

The provision of DPFs in the exhaust systems of diesel engine vehicles is a well-known measure to avoid the discharge of soot particulates from the vehicles. A DPF must be subjected to periodic regeneration processes in which the engine is operated in such a way as to better enable an adequate DPF temperature is maintained for a sufficient time to burn off accumulated soot deposits, for example, by introducing additional fuel into the exhaust flow.

The filter elements of DPFs may be constructed as monolithic bodies of various materials, such as cordierite, silicon carbide and metallic materials, and these can melt, combust or otherwise degrade if overheated. The monoliths may be accommodated in metallic housings which can also melt if overheated. It is therefore necessary to take measures to avoid overheating.

Temperature sensors may be provided in the exhaust flow downstream of the DPF. The output from these sensors is input to a control arrangement such as an engine management system. If a sensor detects a high temperature, signifying overheating, or imminent overheating, of the DPF, a warning signal is given to the driver of the vehicle, and the engine management system may control the operation of the engine to reduce the temperature, or may cause the engine to come to a complete stop, for example.

Typical temperatures arising when a DPF overheats may occur in the region of 900 to 950° C., and this is beyond the material thresholds of current temperature sensors. The costly temperature sensor therefore has to be replaced if overheating occurs.

According to a first aspect of the present application, there is provided an engine exhaust system comprising a diesel particulate filter and a thermal fuse which is disposed in the exhaust flow path through or from the filter, the fuse comprising a body of an electrically conductive fusible material into which extend a pair of electrical contacts of a material having a higher melting point than the fusible material.

The thermal fuse may comprise a casing in which the body of fusible material is disposed, in which case the casing may be tubular and be open at one end for the discharge of the fusible material when molten. The opening may communicate unobstructively with exhaust gas downstream of a particulate filter, where there is no wall separating an inner cavity in which the fusible material in a solid state is stored as originally manufactured. The other end of the tubular casing may accommodate an insulating material through which the electrical contacts extend. In one example, an inner cavity of the fuse is formed only by side walls of the fuse's outer housing and there is no covering between the side walls at an outer edge. See FIG. 3.

The thermal fuse may be oriented such that the fusible material, when molten, can flow under gravity from the open end of the casing. This can be achieved by orienting the thermal fuse so that the open end of the casing opens in the downwards direction. For example, the side walls may be angled at least partially downward with respect to a vertical direction when installed in the exhaust system of a vehicle on level ground. In one example, the fuse is positioned so that it is aligned vertically with the opening facing downward. In another example, an angle of at least 30 degrees from level is formed to enable the molten material to flow out of the cavity. Additionally, the fuse may be positioned so that it is not vertically above any catalytic material, and further so that the exhaust piping vertically below the fuse is also angled downward in a direction of exhaust flow to a tailpipe exhaust to atmosphere so that the molten material does not flow back toward a catalyst or particulate filter.

The thermal fuse may serve to reduce breach of the integrity of the DPF system caused by overheating. The thermal fuse may thus be designed to provide an open circuit between the electrical contacts before any such damage occurs. This can be achieved by suitable selection of the melting point and mass of the body of fusible material.

The diesel particulate filter may have a monolithic filter element, in which case the melting point of the fusible material may be lower than the combustion temperature of the monolithic filter element.

The diesel particulate filter may have a metallic casing, in which case the melting point of the fusible material may be lower than the melting point of the material of the metallic casing.

In one embodiment in accordance with the present application, the melting point of the fusible material is not less than 940° C.

In order to avoid premature activation of the thermal fuse in the event of a transient high temperature, it is desirable for the initial exposure of the thermal fuse to a temperature in excess of the melting point of the fusible material to be followed by a delay period before the body of fusible material melts to cause the contacts to become isolated from each other. This can be achieved by selecting the mass of the body of fusible material so that it will withstand a temperature slightly in excess of the melting point of the fusible material, for example a temperature of 950° C., for not less than 10 seconds.

The electrical contacts may be connected to a control arrangement such as an engine control module to provide an input signal to the control arrangement when the fusible material melts and provides an open circuit between the contacts. The control arrangement may be configured to deliver an output signal in the event that the fusible material melts. The output signal may generate an engine stop signal if the temperature of the exhaust flow is above a predetermined value and may generate a failure warning signal if the temperature of the exhaust flow is less than or equal to the predetermined temperature.

The thermal fuse may be disposed in the exhaust flow downstream of the diesel particulate filter.

The present application also provides a motor vehicle having an engine exhaust system in accordance with the first aspect of the present application, and a thermal fuse for use in an engine exhaust system in accordance with the first aspect of the present application.

According to a second aspect of the present application, there is provided a method of detecting overheating of a diesel particulate filter in an engine exhaust system, the method comprising disposing a thermal fuse in the exhaust flow through or from the filter and monitoring the resistance of the thermal fuse, wherein an increase in the resistance to a value above a predetermined resistance value causes generation of an engine stop signal.

The temperature of the exhaust flow may be monitored, and the engine stop signal may be generated if the resistance of the thermal fuse is above the predetermined resistance value and the temperature of the exhaust flow is above a predetermined temperature. A failure warning signal may be generated if the resistance of the thermal fuse is above the predetermined resistance value and the temperature of the exhaust flow is at or below the predetermined temperature.

In the method in accordance with the second aspect of the present application, the thermal fuse may be in accordance with the first aspect.

For a better understanding of the present application and to show more clearly how it may be carried into effect, reference will now be made, by way of example, to the accompanying drawings.

FIG. 1 shows an exhaust manifold 2 of a motor vehicle engine, a diesel oxidation-catalyst module 4, and a DPF 6, configured to separate particulates from an engine exhaust flow. In the illustrated embodiment, the diesel oxidation-catalyst module 4 and the DPF 6 are coupled together, with the DPF 6 disposed downstream of and in flow communication with the diesel oxidation catalyst module 4. The illustrated embodiment further includes an exhaust conduit 8, connected between the exhaust manifold 2 and the diesel oxidation catalyst module 4. With this configuration, exhaust gas from the engine may pass from the exhaust manifold 2 directly or indirectly to the diesel oxidation catalyst module 4, then on to the DPF 6 and through an exhaust pipe 10 to other, downstream elements of the exhaust system and then exit the tailpipe to the atmosphere 11.

It will be understood that the exhaust conduit 8 may conduct the engine exhaust through one or more other devices en route to the diesel oxidation catalyst module 4. Thus, for example the exhaust conduit 8 may include one or more of a temperature sensor, a lean NOX trap, and a three-way catalyst module disposed downstream of the exhaust manifold 2 and upstream of the diesel oxidation catalyst module 4.

The DPF 6 may be of any known general form, and for example may comprise a monolith, or unitary body, of a porous material provided with passages which communicate with one another through the porous material of the body. The porous material may be any suitable material capable of withstanding the high temperatures that arise in use in the DPF. Suitable materials may be cordierite, silicon carbide and some metallic materials. The monolith is accommodated within a housing, for example of steel.

The flow path through the DPF includes regions of the porous body material, in which particulate material entrained in the exhaust flow becomes trapped. The exhaust flow exiting the DPF is thus substantially free of the particulate material, and in particular sooty material.

As the sooty material accumulates in the pores of the porous material, the effectiveness of the DPF declines. The DPF is periodically regenerated by increasing the temperature of the exhaust flow to a level at which the sooty deposits combust. This is done, for example, by post-combustion introduction of fuel into the exhaust system.

Figure 2:
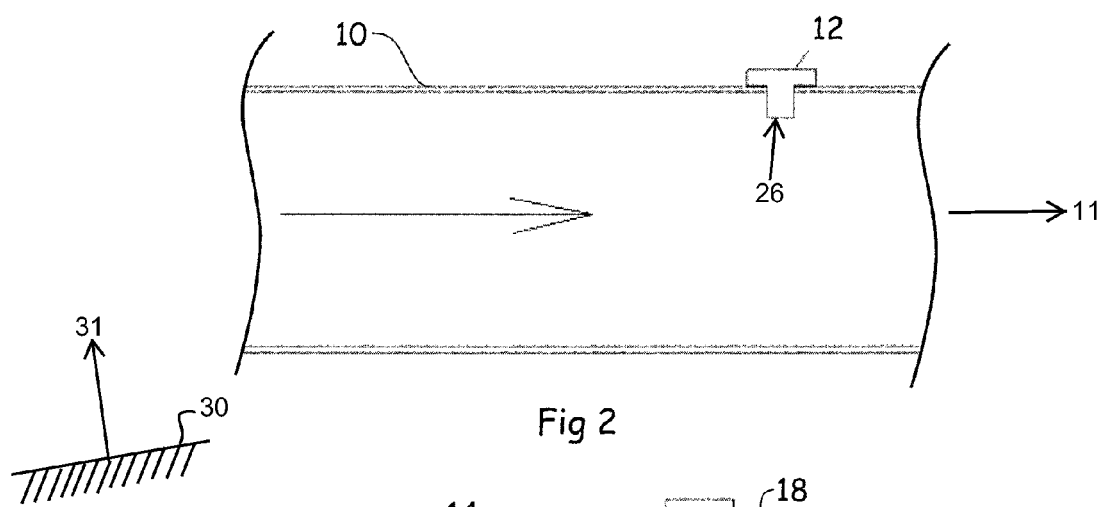
FIG. 2 is a schematic view of a thermal fuse disposed in an exhaust pipe of the system of FIG. 1.

Under some engine operating conditions, the temperature of the DPF can rise to a level above the material thresholds of the either the monolith or the casing of the DPF, for example a temperature at which the monolith or the casing will melt, combust or otherwise degrade. In order to avoid this, a thermal fuse 12 is installed in the exhaust pipe 10 downstream of the DPF 6, as shown in FIG. 2. The purpose of the thermal fuse 12 is to provide a signal which can be used to initiate shut-down of the engine, or other action to reduce the temperature of the DPF, before any damage to the DPF occurs. In one example, illustrated in FIG. 2, the exhaust pipe 10 may be angled downward about 30 degrees from vertical 31 of the level ground 30 to enable the molten material to flow out of the cavity in a direction of exhaust flow to the tailpipe to atmosphere 11 so that molten material does not flow back towards a catalyst or particulate filter. Additionally, the fuse may be positioned so that it is not vertically above any catalytic material and such that the open end 26 is oriented towards the level ground 30 to allow for flow of the thermal material due to gravity upon becoming molten.

Figure 3:
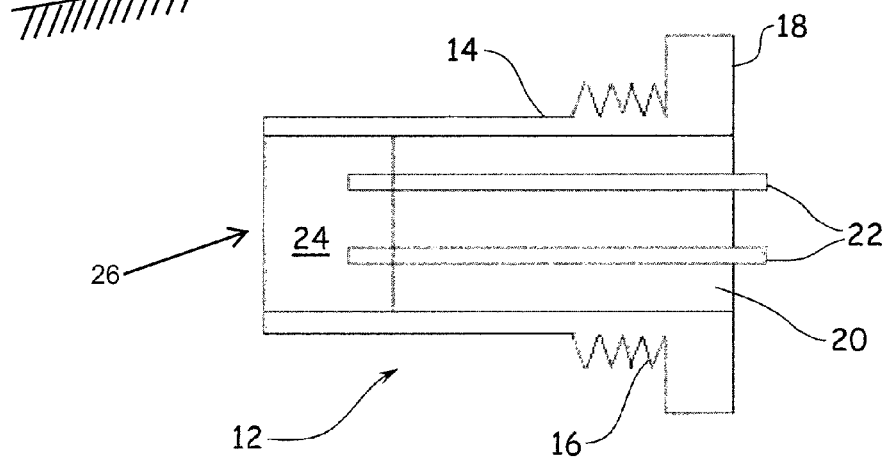
FIG. 3 is an enlarged view of the thermal fuse.

The thermal fuse is represented in greater detail in FIG. 3. It comprises a steel tubular casing 14 having an external screwthread 16 and a head 18 at one end which is profiled, for example is hexagonal, to receive a tool such as a spanner in order to fit the thermal fuse to the wall of the exhaust pipe 10. An insulator 20, for example of ceramic material, is provided within the casing 14, through which extends a pair of electrical contacts, for example, in the form of pins 22. The pins 22 project from the insulator at the end adjacent the head 18 for connection to a control arrangement to be discussed below. At their opposite ends, the pins 22 project into a space within the casing 14 which, in normal circumstances, is filled with a body of electrically conductive fusible material 24. Any suitable material may be used, provided that the melting point of the material is below the temperature at which damage to the DPF as a result of overheating will occur. In one example, an alloy having a melting point of approximately 945° C.±5° C., such as a brass alloy, is used.

It will be appreciated that the electrically conductive fusible material 24 provides an electrical connection between the pins 22, so that the resistance measured between the ends projecting from the head 18 will be very low.

In the event that the temperature of the exhaust gas flowing past the thermal fuse 12 reaches a level close to that at which damage to the DPF may occur, then the body of fusible material 24 will begin to melt. It will be appreciated from FIG. 2 that the thermal fuse is positioned on the upper region of the wall of the exhaust pipe 10, with the open end 26 of the casing 14 (i.e. the end away from the head 18) facing downwards. For example, the open end is communicating unobstructively only at one end of a casing with exhaust flow. Consequently, the fusible material 24, when melted, will flow from the casing 14 into the exhaust pipe 10. When this happens, the ends of the pins 22 previously situated within the fusible material 24 will be electrically isolated from each other and the resistance of the thermal fuse will increase to a relatively high level, above a threshold resistance. In this condition, the thermal fuse 12 can be said to be "activated". For example, a visual inspection of the thermal fuse after being "activated" will show an open space where the fusible material was located.

It will be appreciated that, when the temperature of the exhaust gas flowing in the exhaust pipe 10 reaches the melting point of the fusible material 24, there will be a finite delay period before the material 24 melts to expose the ends of the pins 22. This delay period is dependent on several factors, including the mass of the fusible material 24. The delay period provides the ability of the thermal fuse to withstand transient excursions slightly above the melting point of the fusible material 24 (for example up to 5° C. above the melting point) without the thermal fuse becoming open circuit. For example, the mass of the fusible material 24 may be selected to achieve a delay period of at least 5 seconds, or more typically at least 10 seconds at a temperature of 950° C. For example, during regeneration of the particulate filter, temperatures above the melting point of the electrically conductive material may be achieved for less than 5 seconds. Thus, a mass of the fusible material that may withstand the temperature excursion does not melt and does not form an open circuit. This may protect against a failure warning signal being generated for a temperature excursion wherein the particulate filter is not degraded.

The open end 26 of the thermal fuse places the fusible material 24 in direct contact with the exhaust gas. This may increase reliability and accuracy of the fuse. For example, positioning the thermal fuse in an exhaust passage angled downward with respect to gravity and the fuse positioned in the top portion of the angled exhaust allows the open end to be exposed to flowing combusted exhaust gas from a diesel engine in the exhaust flow path. Further, the open end of the fuse may be fully uncovered.

The thermal fuse 12 is connected, with a series resistor, to a control arrangement which may be, or may be part of, an engine control unit (ECU). In normal operation, the low resistance signifies that the thermal fuse 12 is intact, i.e. that the body 24 provides electrical continuity between the pins 22, and consequently that the thermal fuse has not been activated by exposure to a temperature corresponding to overheating of the DPF 6, for example 950° C.

For example, a resistance in the thermal fuse above a threshold resistance may indicate degradation of the thermal fuse. Further, a temperature above a threshold temperature may indicate degradation, i.e. overheating, of the DPF and degradation of the thermal fuse.

Figure 4:
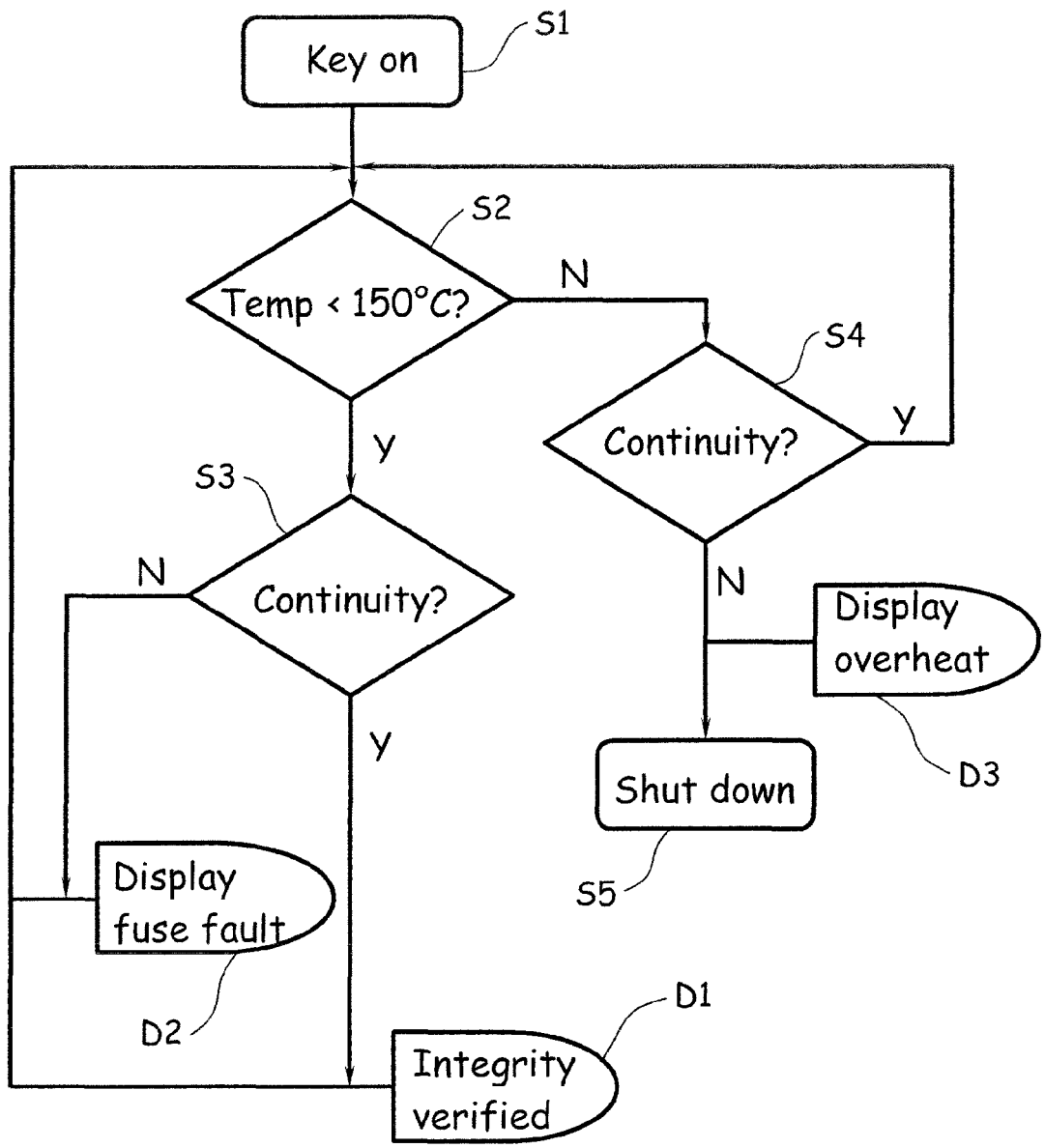
FIG. 4 is a flow chart representing the operation a control arrangement receiving input from the thermal fuse.

An example of a process utilizing the thermal fuse 12 is represented in the flowchart of FIG. 4. Following a Key On step S1, a determination is made at step S2 as to whether or not the temperatures of the exhaust flow upstream and downstream of an exhaust catalyst (i.e. Temperature Pre-Catalyst TPC and Temperature After Catalyst TAC) are below a predetermined threshold temperature representing the engine in the warm-up phase, for example 150° C. If the TPC and TAC are at or below 150° C., step S3 determines whether or not the thermal fuse 12 is conducting. If so, the engine start-up diagnostic routine determines that the integrity of the thermal fuse 12 is verified and an appropriate display D1 is generated, such as the switching-off of a DPF overheat warning light, for example.

If step S3 determines that the thermal fuse 12 is an open circuit, this indicates a fault in the thermal fuse, since the thermal fuse cannot have been activated normally at a temperature at or below 150° C. An appropriate failure warning display D2 is generated warning the driver that the thermal fuse 12 must be checked and/or replaced. For example, a visual inspection of the open end of the thermal fuse may show whether the fusible material is disposed within the casing. If no fusible material is present, the thermal fuse may be replaced. Thus, the thermal fuse is checked to determine if it is functioning via a visual inspection. The process returns to step S1.

When it is determined at step S2 that the engine has warmed up sufficiently for the TPC and TAC to exceed 150° C., the process moves to step S4, which determines whether the resistance signal from the thermal fuse 12 is at a high or low level. If it is at a low level, representing electrical continuity between the pins 22, the process returns to step S2 at a sampling rate determined by a clock signal generated by the ECU. For example, the fusible material is still disposed within the casing, allowing the electrical circuit to be completed between the pins.

If step S4 determines that the resistance signal is at a high level, signifying that the thermal fuse 12 has been activated and the pins 22 form an open circuit, the ECU generates a display D3 to the effect that the DPF has overheated, indicating degradation of the fuse in response to an increase in a resistance of the fuse to above a predetermined resistance. Further, in one example, an engine stop signal may be generated at step S5, which causes the ECU and other vehicle systems to shut the vehicle down in a safe manner, in a calibrateable or programmable time. In another example, step S5 may include indicating degradation by setting a diagnostic code stored in non-transitory memory of an electronic control system of a vehicle in which the engine is mounted.

In one example, the thermal fuse 12 has been described as fitted to the exhaust pipe 10 downstream of the DPF 6. In another example, the thermal fuse 12 may be fitted to the housing of the DPF 6 so that it is directly exposed to the exhaust gas passing through the DPF.

In one example, activation of the thermal fuse 12 has been described as initiating the shutting down of the vehicle. In another example, activation of the thermal fuse may instead, or as an initial procedure, initiate a limitation on the output of the engine or other action which will reduce the temperature of the DPF 6 without stopping the engine. As a further possible initial procedure, the shutting down of the vehicle may be preceded by an instruction to the driver to bring the vehicle to a standstill and switch off the engine as a matter of urgency.

It will be appreciated by those skilled in the art that although the present application has been described by way of example with reference to one or more embodiments it is not limited to the disclosed embodiments and that alternative embodiments could be constructed without departing from the scope of the invention as defined by the appended claims.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
monitoring a resistance of a thermal fuse, in which a body of fusible material is disposed and is open communicating unobstructively only at one end of a casing with exhaust, positioned in an exhaust flow path through or from a particulate filter;
indicating degradation of the fuse in response to an increase in the resistance of the fuse to above a predetermined resistance; and
flowing combusted exhaust gas from a diesel engine to the exhaust flow path, and flowing exhaust past the thermal fuse in an exhaust passage angled downward with respect to gravity, with the fuse positioned in a top portion of the angled exhaust passage with respect to gravity.

2. The method as claimed in claim 1, further comprising indicating degradation of the particulate filter in response to an exhaust temperature above a predetermined temperature.

3. The method as claimed in claim 2, wherein indicating degradation of the particulate filter includes generating an engine stop signal.

4. The method as claimed in claim 1, wherein the fuse has its open end facing downward with respect to gravity, the open end being fully uncovered.

5. The method as claimed in claim 4, wherein the degradation of the fuse is indicated by setting a diagnostic code stored in non-transitory memory of an electronic control system of a vehicle in which an engine is mounted.

6. The method as claimed in claim 2, further comprising generating a failure warning signal responsive to the resistance of the fuse being above the predetermined resistance and the exhaust temperature being at or below the predetermined temperature.

7. The method as claimed in claim 3, wherein the engine stop signal is generated responsive to the resistance of the fuse being above the predetermined resistance and the exhaust temperature being above the predetermined temperature.

* * * * *